April 9, 1957  A. W. T. MOTTRAM  2,788,019
COMBINED STOP AND BY-PASS VALVE
Filed March 6, 1956
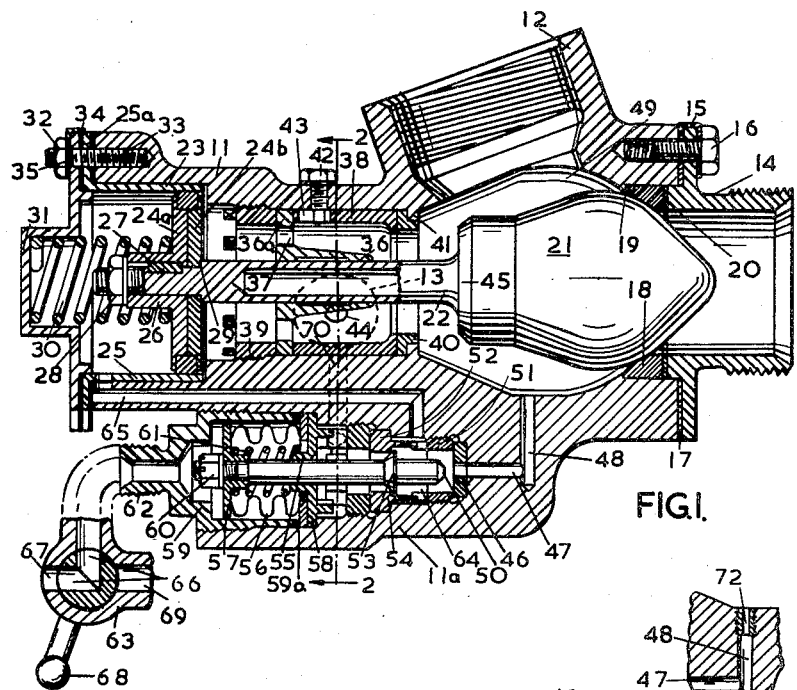
FIG.1.
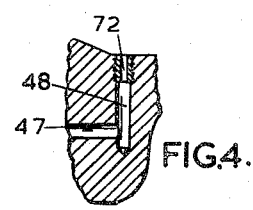
FIG.3.
FIG.4.
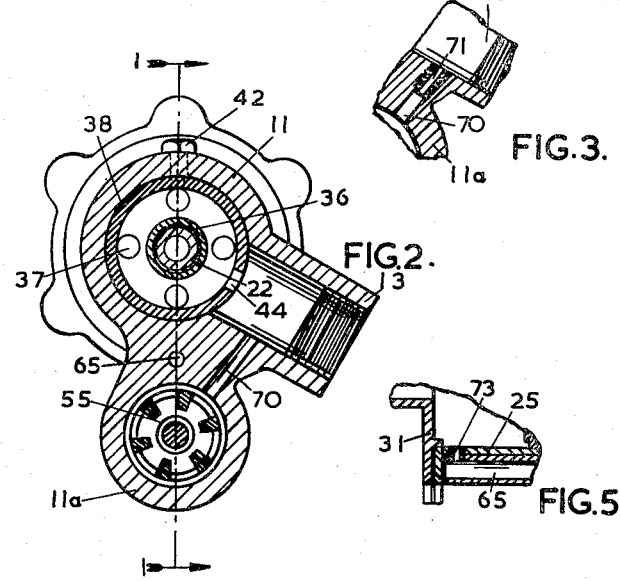
FIG.2.
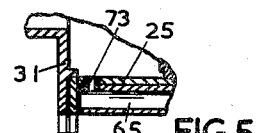
FIG.5.

United States Patent Office 2,788,019
Patented Apr. 9, 1957

2,788,019

COMBINED STOP AND BY-PASS VALVE

Anthony W. T. Mottram, Coventry, England, assignor to Armstrong Siddeley Motors Limited, Coventry, Warwickshire, England Application March 6, 1956, Serial No. 569,887

Claims priority, application Great Britain March 10, 1955

5 Claims. (Cl. 137—625.48)

This invention relates to a combined stop and by-pass valve (particularly for use with liquid oxygen or other low temperature liquid below, say, minus 40° centigrade where sealing difficulties are very pronounced), of the kind having a movable valve member with a head adapted to close a main port, in one position, in which latter a by-pass passage is connected to the inlet of the valve, whereas in the other position of the head the inlet is directly connected to the main port and the communication between the inlet and the by-pass passage is entirely cut off by the head.

An object of the invention is to overcome the sealing difficulty, in a valve of this kind.

A further object is to provide means for controlling the speed of operation of the movable valve member in either or both directions.

According to the invention, the movable valve member is operated through a control valve which, when the main port is closed, connects the said inlet with the remote face of a piston in the casing of the combined valve, the piston being mounted to move with the valve member which is provided with a relatively light spring acting to bias the head in a direction to close the main port, the inlet in these conditions also being connected to the by-pass passage through a restrictor and directly connected to the other (non-remote) face of the piston for partial balance purposes; whilst when an actuating fluid pressure is applied to one end of the control valve to act on the movable element thereof, which is biased to this end of the control valve and sealed by a bellows device, the movable element is moved to a position to close the connection between the said inlet and the remote face of the piston and to connect the latter to the by-pass passage downstream of the restrictor, whereby the resultant load on the said other face of the piston effects movement of the main valve head on to a by-pass seating by which the said inlet is cut off from the by-pass passage.

Thus, no sliding seals are relied upon for the operation of the valve and there are, therefore, no external drains required for the liquid being controlled by the combined valve, the only connections to this being those for the inlet to the valve, the outlet from the main port, the by-pass passage, and the actuating fluid pressure applied to the said one end of the control valve. A packing for the piston of the combined valve is not important as it has only to serve for reducing friction and the risk of "picking-up" or seizure. The actuating fluid pressure is kept segregated from the liquid being dealt with by the combined valve by means of the sealing bellows in the control valve at the said one end.

According to a further feature of the invention, liquid damping of the operation of the main valve in either or both directions is effected by means restricting the flow in the appropriate passage connecting the combined valve and the control valve. The liquid damping which is thus provided is such as will eliminate severe shock loading on the head of the valve or, of course, on the stem attached to the main valve.

In the accompanying drawings:

Figure 1 is a sectional view of one form of combined valve according to the invention, the plane of the section being indicated by the arrows 1—1 in Figure 2;

Figure 2 is a section in the plane indicated by the arrows 2—2 of Figure 1; and

Figures 3, 4 and 5 are sectional details showing different dispositions of restrictors for controlling the speed of operation of the main valve.

In the construction shown, the combined valve has a unitary casing 11 provided with internally screw-threaded, hollow bosses 12, 13 respectively serving as the inlet (from means, not shown) for the low temperature liquid and as the by-pass passage. An externally screw-threaded union 14, for connection to a delivery means (not shown) for the said liquid, has a flange 15 which is secured by a ring of screws 16 around an open end of the casing, with a sealing washer 17 between them. The union has an axial extension at its inner end which holds a seating ring 18, for the main valve, in position against a step 19 in the said open end. The ring 18 is a close fit in the latter, and there is a compressible sealing washer 20 between the ring and the said extension.

The head 21 of the main valve is somewhat pear-shaped, as shown, so as, when in one extreme position, to provide a substantial seat for the main port defined by the ring 18, and so as not to interfere with the flow when the main port is opened. The stem 22 of the main valve carries at its opposite end a piston provided with a packing 23 working in a cylinder liner 25 within this end of the casing 11, the packing serving to reduce friction and the risk of "picking-up." The piston is shown formed in two coaxial parts 24a, 24b which are shaped to define a peripheral groove to receive the packing 23, the part 24a having an axial boss 26 which is keyed at 27 to the valve stem, and the latter having a screw-threaded end on which works a nut 28 to hold the part 24b up to a shoulder 29 of the valve stem.

Disposed within the liner is a light compression spring 30 which acts between the piston part 24a (constituting the aforesaid remote face of the piston) and a cup-like closure plate 31 for this open end of the casing 11. The plate 31 is shown provided with a flange between which, and the casing 11, is clamped, by nuts 32 on a ring of studs 33, a flange 25a of the liner, seals being provided by washers 34. Lock washers for the nuts are indicated at 35.

Intermediate its ends the stem 22 is supported by a flanged valve guide 36, the flange 36a having ports 37 therethrough and the outer periphery being held up to one end of a sleeve 38 by a ring nut 39 working in a screw-threaded bore of the casing 11. The nut 39 urges the sleeve to hold a by-pass valve seat 40 up to a step 41 of the casing, and the sleeve, which is of slightly less diameter than the liner, is held from turning in the casing by a set-screw 42 which engages in a longitudinal slot 43 of the sleeve.

The sleeve 38 communicates radially with the by-pass passage 13 through a restrictor 44.

The by-pass valve seat 40 is closed by a surface 45 of the head 21 when the latter is in its other extreme position, the seat 40 forming the inlet to the by-pass passage 13 upstream of the restrictor 44.

The control valve is shown disposed on that side of the combined valve casing opposite to the inlet 12, and it shares the casing 11 although, for convenience, the portion of the casing appropriate to the control valve is denominated 11a.

The control valve includes a valve seat 46 which communicates, through ducts 47, 48 with the inlet space, indicated at 49, existing between the seating ring 18, and seat 40, and around the head 21. The valve seat 46 coacts with a nose 50 of a movable valve member, and is held in position by a castellated nut 51 working in a screw-threaded bore of the casing 11a. A second valve seat 52, for coaction with a second valve surface 53 of the movable valve member, is held against an internal step of the casing by a second castellated nut 54, and the seat 52 has integral, axial fingers, as shown, engaging between the castellations of the nut 51 to prevent relative turning. Similarly, a guide 55 for the movable valve member has a radial flange with axial fingers engaging between the castellations of the nut 54, as shown, for the like purpose.

A metallic bellows 56 has its ends respectively sealingly fast, as by soldering, with a second guide 57 for the movable valve member and with an annular disc 58 of which the periphery extends radially outwards of the bellows. A screw-threaded, hollow part 59 engaged in the casing 11a holds the periphery of the disc 58, with an interposed packing washer 59a, abutted against the radial flange of the guide 55, and its bore provides a guide for the periphery of the guide 57. The latter is held up to a step on the movable valve member by a nut 60 on a screw-threaded end of the latter, and both guides have hubs engaged in the adjacent ends of a compression spring 61 within the bellows.

The part 59 is provided with an externally screw-threaded union 62 for a pressure-fluid line which includes a two-way cock 63.

With the parts shown in the position of Figure 1, in which it is assumed that there is no low temperature liquid being supplied under pressure to the inlet 12, the valve head 21 will be biassed to the position shown to engage the main port seating ring 18 by the compression spring 30. If now the liquid is supplied under pressure through the inlet 12 to the inlet space 49 it will pass through the valve 40, 45 to the by-pass outlet 13 through the restrictor 44, which latter is of a size to limit the flow to match the characteristics of a pump (not shown) supplying the said liquid at a pressure of, say, fifty-five kilogrammes per square centimeter. The liquid pressure is also communicated through the ducts 48 and 47, and the open valve 46, 50 to a space 64 of which the opposite end is closed by the valve 52, 53. This space communicates, through a duct 65 in the casing, with the chamber bounded by the liner 25, the piston part 24a and the closure plate 31. At the same time, the pressure of the said liquid is applied through the open valve 40, 45, and the ports 37 of the valve guide 36, to the part 24b of the piston. In these conditions the piston is substantially pressure-balanced and the head 21 is retained on the seating ring 18 by the liquid pressure in the inlet space 49 acting across the area of the valve head. The cock 63 is in the position shown in which its elbow-duct 66 establishes a communication between the interior of the part 59 of the control valve and a port 67 venting to atmosphere.

By operating the cock (e. g., by a handle 68) to a position in which the elbow duct establishes a communication between a fluid-pressure line 69 (e. g., at twenty-five kilogrammes per square centimeter) and the interior of the part 59, the guide 57 acts as a piston and closes the bellows against the effort of the spring 61 until the valve 46, 50 closes, and the valve 52, 53 opens. This isolates the ducts 48, 47 from the duct 65, and puts the latter into communication with a duct 70 which leads from a chamber existing between the seat 52 and the guide 55, to the by-pass outlet 13 in a position downstream of the restrictor 44. The liquid acting on the piston part 24a is therefore expressed through this communication by the pressure of the liquid acting on the piston part 24b, and the said pressure causes the head 21 to leave the seating ring 18 (whereby to open the main delivery port) and to close the by-pass valve 40, 45. The head 21 is held in this position by the pressure drop acting across the valve seat 40.

When it is next desired to cut off the delivery of the liquid from the inlet 12 to the main port, the cock 63 is operated to vent the interior of the part 59 to atmosphere through the port 67. In these conditions the liquid pressure in the ducts 48, 47 acts on the nose 50 of the movable member of the control valve, and, in conjunction with the compression spring 61, again opens valve 46, 50, and closes valve 52, 53 to re-establish the supply of liquid through the duct 65. The effect of this is to actuate the piston to move the head 21 to open valve 40, 45 and close the main port whereafter the piston becomes substantially pressure-balanced with the head retained on its seating 18 by the pressure in the space 49, as previously described. In other words, the parts will have resumed the positions shown in Figure 1.

Regulation of the damping and therefore the speed of opening of the main port may be effected by means of a restriction 71 in the duct 70 as shown in Figure 3; conversely, it is possible to slow down the movement of the head in the direction to close the main port by providing a restriction 72 in the duct 48 as shown in Figure 4.

Alternatively, if it is desired to slow down movement of the head 21 both when opening and when closing, this may be achieved by means of a restriction 73 in the duct 65 as shown in Figure 5.

What I claim as my invention and desire to secure by Letters Patent of the United States is:

1. A combined stop and by-pass valve, for a low temperature liquid, comprising a valve body having an inlet, a main port, and a by-pass passage for the medium, a restrictor in said passage, a movable valve member with a head which in one extreme position closes said port and connects said inlet to said passage, said valve member in its other extreme position directly connecting said inlet to said port and isolating said inlet from said passage, a piston fast with said valve member and working in a cylinder in said body, means lightly biasing said valve member to said one extreme position, a control valve having a movable element, said control valve having a first communication with said inlet, a second communication with said cylinder at the side of said piston remote from said port and a third communication with said passage in a position downstream of said restrictor, said control valve having an inlet for a pressure fluid to act on said element for moving it to an extreme position in which it closes said first communication and interconnects said second and third communications whereby to permit the medium at said remote side of said piston to pass through said second and third communications to said passage and permit said valve member to move from its said one extreme position to its said other extreme position, a bellows device effecting a seal between said element and a cylinder in which it works, said device isolating said pressure fluid from said communications, means biasing said element in the reverse direction to said pressure fluid, said means when said pressure fluid is not acting on said element operating the latter to an opposite extreme position in which said first and second communications are interconnected and said third communication is closed whereby to cause said piston to move from its said other extreme position to its said one extreme position.

2. A combined stop and by-pass valve, for a low temperature liquid, comprising a valve body having an inlet, a main port, and a by-pass passage for the medium, a restrictor in said passage, a movable valve member with a head which in one extreme position closes said port and connects said inlet to said passage, said valve member in its other extreme position directly connecting said inlet to said port and isolating said inlet from said passage, a piston fast with said valve member and working in a cylinder in said body, means lightly biasing said valve member to said one extreme position, a control valve having a movable element, said control valve including a space, a first communication between said space and said inlet, a second communication between said space and said cylinder at the side of said piston remote from said port and a third communication between said space and said passage in a position downstream of said restrictor, said element provided with spaced valve members respectively for coaction with valve seatings at opposite ends of said space, said valve seatings being more widely spaced than said spaced valve members whereby only one of the latter can engage its seating at any one time, said control valve having an inlet for a pressure fluid to act on said element for moving it to an extreme position in which one of said spaced valve members engages its coacting seating to close said first communication and the other of said spaced valve members disengages its coacting seating to interconnect said second and third communications whereby to permit the medium at said remote side of said piston to pass through said second and third communications to said passage and permit the first said valve member to move from its said one extreme position to its said other extreme position, a bellows device effecting a seal between said element and a cylinder in which it works, said device isolating said pressure fluid from said communications, means biasing said element in the reverse direction to said pressure fluid, said means when said pressure fluid is not acting on said element operating the latter to an opposite extreme position in which said first and second communications are interconnected and said third communication is closed whereby to cause said piston to move from its said other extreme position to its said one extreme position.

3. A combined stop and by-pass valve, for a low temperature liquid, comprising a valve body having an inlet, a main port, and a by-pass passage for the medium, a restrictor in said passage, a movable valve member with a head which in one extreme position closes said port and connects said inlet to said passage, said valve member in its other extreme position directly connecting said inlet to said port and isolating said inlet from said passage, a piston fast with said valve member and working in a cylinder in said body, means lightly biassing said valve member to said one extreme position, a control valve having a movable element, said control valve having a first communication with said inlet, a second communication with said cylinder at the side of said piston remote from said port and a third communication with said passage in a position downstream of said restrictor, a restrictor in said first communication, said control valve having an inlet for a pressure fluid to act on said element for moving it to an extreme position in which it closes said first communication and interconnects said second and third communications whereby to permit the medium at said remote side of said piston to pass through said second and third communications to said passage and permit said valve member to move from its said one extreme position to its said other extreme position, a bellows device effecting a seal between said element and a cylinder in which it works, said device isolating said pressure fluid from said communications, means biassing said element in the reverse direction to said pressure fluid, said means when said pressure fluid is not acting on said element operating the latter to an opposite extreme position in which said first and second communications are interconnected and said third communication is closed whereby to cause said piston to move from its said other extreme position to its said one extreme position, said restrictor in said first communication retarding the speed at which said valve member moves to close said main port as compared with the speed at which said valve member moves to open said main port.

4. A combined stop and by-pass valve, for a low temperature liquid, comprising a valve body having an inlet, a main port, and a by-pass passage for the medium, a restrictor in said passage, a movable valve member with a head which in one extreme position closes said port and connects said inlet to said passage, said valve member in its other extreme position directly connecting said inlet to said port and isolating said inlet from said passage, a piston fast with said valve member and working in a cylinder in said body, means lightly biassing said valve member to said one extreme position, a control valve having a movable element, said control valve having a first communication with said inlet, a second communication with said cylinder at the side of said piston remote from said port and a third communication with said passage in a position downstream of said restrictor, a restrictor in said third communication, said control valve having an inlet for a pressure fluid to act on said element for moving it to an extreme position in which it closes said first communication and interconnects said second and third communications whereby to permit the medium at said remote side of said piston to pass through said second and third communications to said passage and permit said valve member to move from its said one extreme position to its said other extreme position, a bellows device effecting a seal between said element and a cylinder in which it works, said device isolating said pressure fluid from said communications, means biassing said element in the reverse direction to said pressure fluid, said means when said pressure fluid is not acting on said element operating the latter to an opposite extreme position in which said first and second communications are interconnected and said third communication is closed whereby to cause said piston to move from its said other extreme position to its said one extreme position, said restrictor in said third communication retarding the speed at which the valve member moves to open said main port as compared with the speed at which said valve member moves to close said main port.

5. A combined stop and by-pass valve, for a low temperature liquid, comprising a valve body having an inlet, a main port, and a by-pass passage for the medium, a restrictor in said passage, a movable valve member with a head which in one extreme position closes said port and connects said inlet to said passage, said valve member in its other extreme position directly connecting said inlet to said port and isolating said inlet from said passage, a piston fast with said valve member and working in a cylinder in said body, means lightly biassing said valve member to said one extreme position, a control valve having a movable element, said control valve having a first communication with said inlet, a second communication with said cylinder at the side of said piston remote from said port and a third communication with said passage in a position downstream of said restrictor, a restrictor in said second communication, said control valve having an inlet for a pressure fluid to act on said element for moving it to an extreme position in which it closes said first communication and interconnects said second and third communications whereby to permit the medium at said remote side of said piston to pass through said second and third communications to said passage and permit said valve member to move from its said one extreme position to its said other extreme position, a bellows device effecting a seal between said element and a cylinder in which it works, said device isolating said pressure fluid from said communications, means biassing said element in the reverse direction to said pressure fluid, said means when said pressure fluid is not acting on said element operating the latter to an opposite extreme position in which said first and second communications are interconnected and said third communication is closed whereby to cause said piston to move from its said other extreme position to its said one extreme position, said restrictor in said second communication slowing down the speed at which said valve member moves to open and close said main port.

No references cited.